June 4, 1963 W. BARTHOLOMÄUS 3,092,034
AXIAL PISTON ENGINES
Filed Feb. 18, 1959 3 Sheets-Sheet 1

INVENTOR
WERNER BARTHOLOMÄUS

INVENTOR
WERNER BARTHOLOMÄUS

3,092,034
AXIAL PISTON ENGINES
Werner Bartholomäus, Berlin-Dahlem, Germany, assignor to Kämper-Motoren G.m.b.H., Berlin, Marienfeld, Germany
Filed Feb. 18, 1959, Ser. No. 794,195
6 Claims. (Cl. 103—162)

The present invention relates, in general, to pumps and, in particular, to axial piston engines which may be utilized both as pump units as well as motive devices in hydrostatic drives, as in hydraulic presses.

Axial piston engines of the type to which the present invention relates are utilized both in various fixed or rigid devices to provide constant supplies of various elements as well as in pivotable devices to provide variable or regulatable supplies or outputs of said elements or materials.

The illustrated embodiment of the present invention relates primarily to a variable device, but it is equally applicable to a fixed or rigid device.

The present invention relates to an arrangement of an axial piston engine wherein the entire unit itself maintains its fixed or rigid position in every adjusted phase of the engine. In lieu of pivoting the body of the engine or machine itself, there is movable in the present embodiment only a special pivotal system within the machine housing, the latter, including the drive mechanism thereof, being mounted in fixed or rigid condition.

In view of the foregoing basic features of the present invention relating to an axial piston engine, there results several advantages over prior art devices of said type. Primary features of the present invention are the suspension of the drive shaft within a central support tube or pipe and the suspension of the rotating cylinder on the central support pipe.

It is a primary object of the present invention to provide means contributing to a compact drive mechanism which has superior dynamic running properties.

It is another object of the present invention to provide means assuring an extensive freedom from vibration. In view of the transverse forces occurring when the pivot body is in oblique position, this proves to be of particular advantage, since an extensive freedom from vibration can be afforded by the suspension when care is taken that the transverse component of these forces lies in the plane of the maximum carrying or load capacity of the suspension.

It is another object of the present invention to provide means resulting in the avoidance of the rocking up of vibrations due to imbalance. In this connection, the transmission of the torque from the drive shaft to the cylinder body is effected by an engaging element or claw provided at the end of the drive shaft. This engages in complementary grooves machined into the cylinder body or with another engaging member. This provides for a mechanical, but non-rigid, connection between the two parts and this is particularly advantageous because it reliably avoids a mutual influence of the bearing pressures and consequently of the stresses due to occurring pull-out torques or impacts, including particularly the rocking up of the vibrations due to imbalance.

It is an additional object of the present invention to provide means conducive to the greatest possible protection of the suspension and consequently resulting in a considerable reduction or elimination in the possibility of the occurrence of trouble and disturbance in the machine operation.

It is a further object of the present invention to provide means minimizing or obviating the occurrence of output losses, harmful vibrations, undesirable noise and changes of form in the pressure-carrying structural elements of the machine.

It is a still further object of the present invention to provide means contributing to the formation of an enclosed and compact unit of the described type.

It is a still further object of the present invention to provide means redounding to the absorption of considerable gear pressure of the connected receiving or delivering gear elements.

These and other objects of the invention will become further apparent from the following detailed description, reference being made to the accompanying drawings showing a preferred embodiment of the invention.

In the drawings which illustrate the best mode presently contemplated for carrying out the invention:

Figure 1:
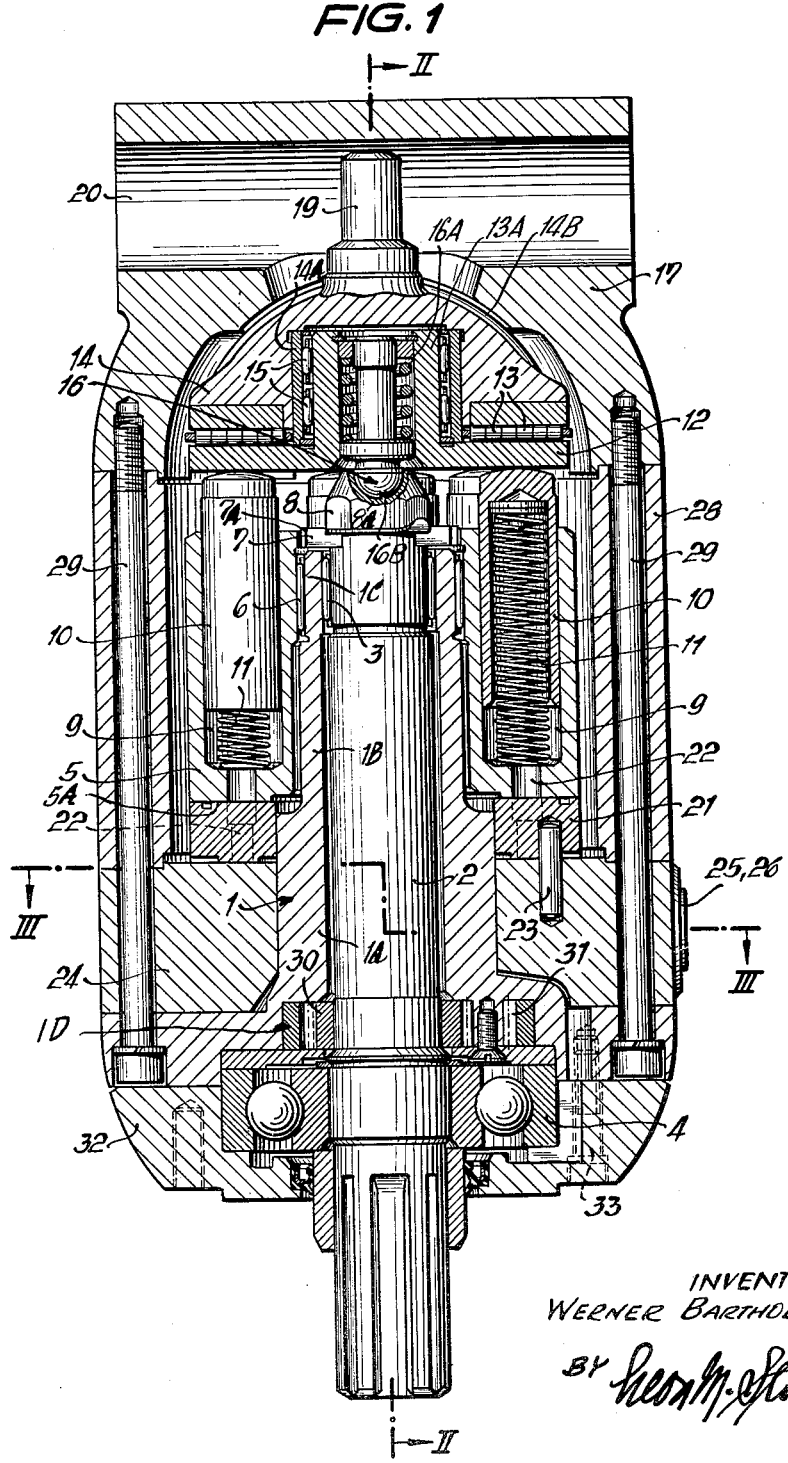
FIG. 1 is a longitudinal sectional view through an axial piston engine pursuant to the present invention.
Figure 2:
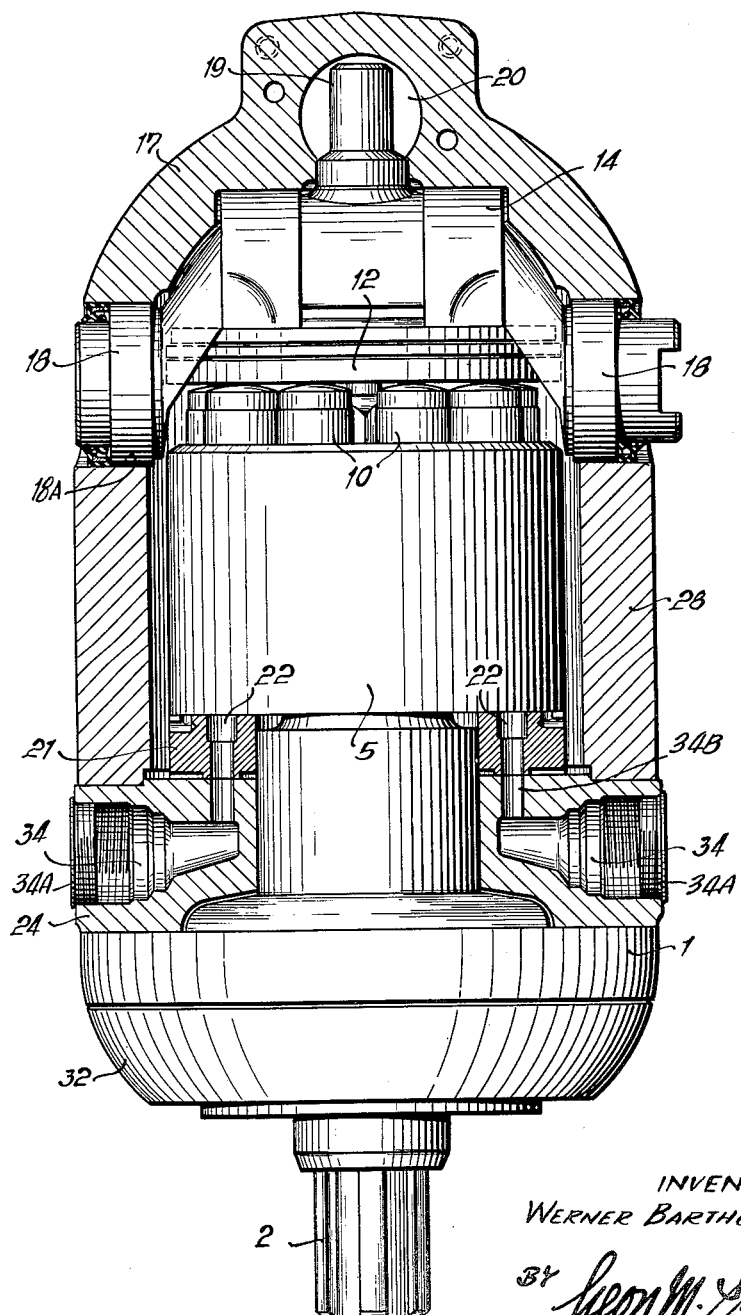
FIG. 2 is a sectional view taken on line II—II of FIG. 1.
Figure 3:
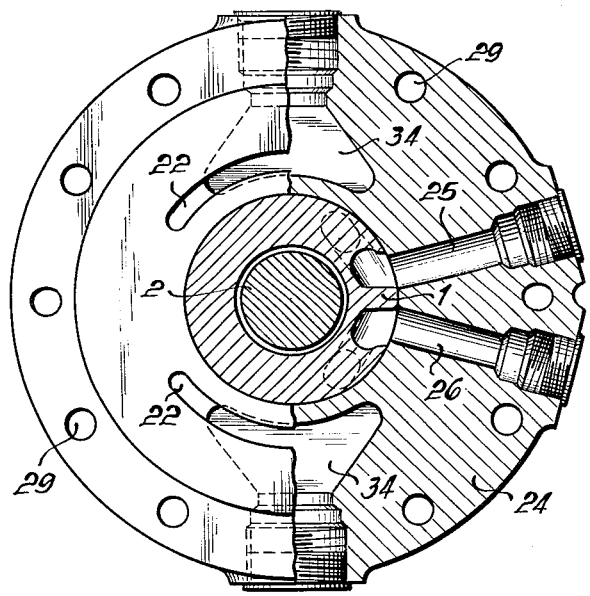
FIG. 3 is a sectional view taken on line III—III of FIG. 1.

According to the present invention, an adjustable or variable piston stroke is achieved by pivoting a control body. The pivot body is mounted so that its roll-shaped pressure face rotates in a complementary concave counterface and with pivot pins on opposite sides mounted in complementary bores in the casing. Due to this suspension, radial forces generated in the pivot body are transmitted to the housing elements so that the latter are likewise exposed to transverse stresses. According to the present invention, the pivot body is mounted in the drive shaft by means of a bearing journal so as to limit these transverse forces and to transmit them, at least in part, to the central mounting pipe so as to relieve the housing elements. As a result, there is established a second flow of force for the transmission of these transverse forces of the pivot body to the central mounting tube.

An axially rotatable pivot disk is mounted radially in the pivot body and axially in the direction of pressure by means of rollers, resiliently biased pistons being mounted by spherical pressure faces on the plane face of the disk. From the fixed structural elements of the group, adjacent the level control face of the cylinder body, the control disk is received in its bore by the central supporting pipe and is centered thereby. The control disk is a plane plate of medium thickness and contains the control slots for the compression and suction sides in the form of straight perforations.

Adjacent the control disk, and similarly centered in its bore, the connecting body is received by the central support tube. Said body contains the connecting threads for the compression and suction lines, as well as the corresponding ducts to the control slots.

The connecting body and the control disk are formed as median-centered plane plates relative to the central support tube so that the flow paths, through which the pressure medium must pass, can be made extremely short.

It is very important, in high and very high pressure ranges, to make the flow paths as short as possible and to force them to change their directions as little as possible. Otherwise output losses, harmful vibrations and undesirable noise may be caused. In addition, possible changes of form in the pressure-carrying structural elements, which may be formed as pivot bearing points, may result and greatly reduce the efficiency and operating safety of the engine. An axial piston engine having the features of the present invention, and in particular a control disk and connecting body according thereto, provide these desired results to a high degree.

Another highly novel feature of the present invention, characterized by the basic element of the central supporting member, is the securement of all fixed machine and housing parts to this central supporting element. By means of a set of continuous expansion screws, the connecting body with control disk, the casing and the rear bearing cover are connected with the central supporting pipe to form an enclosed and compact unit, the parts being also centrally received by the same supporting element and thus adjusted in radial direction.

Furthermore, the combination of the movable and fixed elements of the axial piston engine, and their association with the central support pipe, makes it possible to arrange a gear lubricating pump in the support pipe, designed as a housing and coaxially to the drive shaft. The regulating elements and the gliding surfaces of the pivot body are lubricated by the pressurized oil delivered thereby, so that no high pressure oil need be shunted, said oil-shunting would only impair the efficiency of the engine. The oil required for the housing is passed across a spring-loaded ball valve through bores in the housing wall to the setting drive and the bearing surfaces of the pivot body as well as to the radial-axial suspension of the pivot disk. Said valve acts as a check and excess pressure valve.

The basic element, which is the central supporting pipe, also provides suspension for one end of the drive shaft and supports the bearing cover which closes the machine body. A complementary recess, which receives the outer ring of a roller bearing, serves also as a centering means for the bearing cover which encloses this bearing, which cover must be particularly strong. Consequently, the bearing is of importance to the functioning of the machine because it absorbs considerable gear pressure of the connected receiving or delivering gear elements. This is unknown in the prior art.

The disk-like design of the connecting body enables a particularly advantageous differential pressure valve construction. Said valve functions as a double-action excess pressure valve since it opens only at a predetermined pressure level, with the engine operating as a pump either in clockwise or counterclockwise rotation. The valve body, which is designed as a cylindrical sleeve, is inserted into a complementary bore in the connecting body and terminates at the end face with the plane face thereof. The valve stem, which is resiliently supported with a predetermined initial stress, has a triple-stepped diameter whereby it offers an impact surface of different size, in each direction of flow, to the pressurized medium, so that the same effect is produced in both directions of flow.

Referring now to the drawings in detail, the reference numeral 1 indicates the central supporting tube in which there is mounted, in a needle bearing 3 and ball bearing 4, the drive shaft 2. The tube 1 also mounts the cylindrical body 5 by means of a needle bearing 6. The drive shaft 2 is connected to the cylinder body 5 by a non-rigid mechanical coupling comprising a claw, catch or striker element 7 which is retained in threaded engagement on the drive shaft 2 by a nut 8. The engaging element 7 extends into a complementary recess 7A defined in the cylindrical body 5.

Cylindrical bores 9 are defined in the body 5. Pistons 10 are mounted in the bores 9. Springs 11, seated in the bores 9, resiliently bias the pistons against the pivot disk 12. The disk transmits the operating pressure, in an axial direction, across the roller bearings 13, to the pivot body 14. The pivot body is recessed, as at 14A, and the disk is provided with a collar 13A which extends into the recess and is mounted therein for rotation in radial direction by the needle bearings 15. A bearing journal 16 is resiliently mounted, by means of spring 16A, in an axial direction in the collar 13A of the pivot disk. The ball 16B of the bearing journal is seated in a concave socket 8A in the nut 8. The pivot body 14, provided with a roller-shaped pressure face 14B, pivots in the rear bearing cover 17. The pivot body is provided also with bearing journals 18 which rotate in bores 18A in the casing 28. The pivot body 14 can be displaced by means of a driving bar (not illustrated) which may be inserted into the cylindrical bore 20, of the rear bearing cover 17, to engage the pin 19.

The planar face 5A of the cylindrical body 5 slides on the control disk 21. Control slots 22, for both the compression and suction sides of the device, are formed in the control disk 21. The control disk is centered on the maximum diameter portion 1A of the central supporting tube 1 and is secured against rotation by pins 23 which extend from the connecting element or body 24.

It will be noted that the tube 1 is of a stepped diameter arrangement, having the successively narrower diameter portions 1A, 1B and 1C. The connecting member 24 is also mounted on the maximum diameter portion 1A of tube 1, being centered thereon at the drive end of the device, adjacent the control disk 21. The member 24 is provided with the compression and suction lines 34—34, threaded connectors 34A—34A for said lines, and channels 34B—34B from the lines to the control slots 22—22 of the control disk 21, FIG. 5.

The central tube 1 is recessed, as at 1D, for receiving a gear lubricating pump which comprises an externally toothed gear 30, secured on the drive shaft 2, and an internally toothed gear 31 in eccentric relation thereto and meshing therewith.

Oil is admitted to the pump from the oil reservoir through one of the lines 25—26, FIG. 5, the other of which leads to control or regulating devices located externally of the pump and belonging to the complete system.

The central support tube 1 also supports the ring-groove-bearing 4 of drive shaft 2 at the drive shaft end of the device. This bearing is made especially strong and also transmits the tooth pressures, which must be absorbed by this bearing, to the entire machine body.

The continuous expansion screw 29 connects the rear bearing cover 17 with the pivot body 14 and pivot disk 12, the casing 28 and the connecting member 24 with the control disk 21, with the central support tube 1. The bearing cover 32 holds the ring-groove-bearing 4. Screws 33 secure the bearing cover 32 to the central support tube 1, so that by means of these two screw connections all parts of the unit, including the movable as well as the fixed parts, are assembled with the central tube 1 to form a complete machine unit.

In operation, and with the engine operating as a pump, the drive shaft 2 will rotate causing rotation of the cylindrical body 5 and associated pistons 10. The pistons engage the pivot disk 12. In the position as is shown in FIG. 1, the engine is at a neutral position. However, by engaging the projection 19, the pivot body and hence the pivot disk 12 may be dislocated to a desired angle forming an eccentric surface and causing the pistons to reciprocate and thus pump fluid delivered to and from cylindrical body 5 through the control disk 21.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. In an adjustable axial piston engine, a drive shaft, a cylindrical body having at least one cylinder therein, resiliently biased piston means in such cylinders, a pivot disk pivotly mounted adjacent said cylindrical body and engaged by said piston means, a central supporting tube disposed around said shaft and located adjacent the end of said cylindrical body remote from said pivot disk, a control disk engaging a peripheral portion of said central supporting tube and having separated inlet and discharge passageways for discharging and receiving fluid to and from said cylinder, bearing means rotatably supporting said shaft within said cylindrical supporting tube adjacent each end thereof, exterior bearing means on said cylindrical supporting tube adjacent one end thereof rotatably and tiltably supporting said cylindrical body thereon, and a non rigid drive coupling connected between said drive shaft and said cylindrical body, whereby to permit pendulum movement of the cylindrical body for adaptation and adjustment relative to said control disk and said pivot disk during rotation thereof.

2. In an adjustable axial piston engine according to claim 1, said central supporting tube having a flanged portion at the end adjacent said control disk, and combination connecting and pivot body cover means surrounding said cylindrical body and mounted on the flanged portion of said central supporting tube and common bolt means securing said combination connecting pivot body cover means to said flange portion of the central supporting tube.

3. In an adjustable axial piston according to claim 1, and said central supporting tube having a flange portion adjacent the end thereof adjacent said control disk, a connecting member disposed between said control disk and the flange portion of said supporting tube, said connecting member having cooperating inlet and discharge passages in fluid communication with the corresponding passages of said control disks, a tubular casing member surrounding said cylindrical body, a bearing cover connected to said tubular casing member, and, bolt means connected between said flange portion of said supporting tube and said bearing cover to fix the connecting and casing members and the bearing cover to the flanged portion of said supporting tube.

4. An adjustable axial piston engine according to claim 3, wherein said combination connecting tube and bearing cover means includes a connecting member disposed adjacent said control disk, a tubular member extending around the exterior of said cylindrical body and a bearing cover having the inner spherical wall, and bolt means connected between said supporting tube and said bearing cover and extending through said connecting member and said cylindrical cover.

5. An adjustable axial piston engine according to claim 3, wherein said cylindrical supporting tube includes a recess defining a gear pump chamber, a gear affixed to said shaft and rotatable in said chamber, and a second gear rotatably mounted in said pump chamber in meshing engagement with said gear to effect gear pump action.

6. An adjustable axial piston engine according to claim 1, wherein said central supporting tube includes an exterior surface of smaller diameter adjacent said pivot disk end and bearing means thereon rotatably supporting said cylindrical body, said body being spaced apart from a widened diameter intermediate portion of said supporting tube.

References Cited in the file of this patent

UNITED STATES PATENTS

| | | |
|---|---|---|
| 1,308,844 | Ferris et al. | July 8, 1919 |
| 1,573,525 | Sandoz | Feb. 16, 1926 |
| 1,624,363 | Rey | Apr. 12, 1927 |
| 2,141,935 | Rose | Dec. 27, 1938 |
| 2,341,768 | Gondek | Feb. 15, 1944 |
| 2,445,232 | Molly | July 13, 1948 |
| 2,619,041 | Born | Nov. 25, 1952 |
| 2,649,741 | Henrichsen | Aug. 25, 1953 |
| 2,769,393 | Cardillo | Nov. 6, 1956 |
| 2,776,629 | Keel | Jan. 8, 1957 |

FOREIGN PATENTS

| | | |
|---|---|---|
| 500,299 | Great Britain | Feb. 7, 1939 |
| 500,937 | Great Britain | Feb. 16, 1939 |
| 522,717 | Germany | Apr. 14, 1931 |
| 597,476 | Germany | May 25, 1934 |
| 1,137,272 | France | Jan. 14, 1957 |